United States Patent
Bott et al.

(10) Patent No.: US 11,751,009 B2
(45) Date of Patent: *Sep. 5, 2023

(54) CUSTOMIZED PAIRED LOCATION TRACKING AND METHOD OF USE THEREOF

(71) Applicant: BlinkTech, LLC, a Wisconsin limited liability company, Milwaukee, WI (US)

(72) Inventors: William Bott, Milwaukee, WI (US); Piper Gasiorowski, Milwaukee, WI (US); Daniel Hasbani, Glendale, WI (US); Dan Giralte, Milwaukee, WI (US)

(73) Assignee: BlinkTech, LLC, Milwaukee, WI (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/499,426

(22) Filed: Oct. 12, 2021

(65) Prior Publication Data
US 2022/0030387 A1 Jan. 27, 2022

Related U.S. Application Data

(63) Continuation of application No. 16/670,347, filed on Oct. 31, 2019, now Pat. No. 11,166,122.

(51) Int. Cl.
| | |
|---|---|
| *H04W 4/02* | (2018.01) |
| *G01C 21/34* | (2006.01) |
| *G01C 21/36* | (2006.01) |
| *H04W 8/00* | (2009.01) |
| *H04W 4/80* | (2018.01) |
| *H04W 68/00* | (2009.01) |
| *H04W 76/10* | (2018.01) |

(52) U.S. Cl.
CPC ........ *H04W 4/023* (2013.01); *G01C 21/3438* (2013.01); *G01C 21/367* (2013.01); *H04W 4/80* (2018.02); *H04W 68/005* (2013.01); *H04W 76/10* (2018.02)

(58) Field of Classification Search
CPC ..... H04W 4/023; H04W 4/80; H04W 68/005; H04W 76/10; H04W 4/021; H04W 8/005; G01C 21/3438; G01C 21/367
See application file for complete search history.

(56) References Cited

U.S. PATENT DOCUMENTS

| | | | | |
|---|---|---|---|---|
| 6,618,593 | B1 * | 9/2003 | Drutman | G08B 21/0294 455/414.1 |
| 11,166,122 | B2 * | 11/2021 | Bott | H04W 4/80 |
| 2015/0072713 | A1 | 3/2015 | Zhu | |
| 2015/0133162 | A1 | 5/2015 | Meredith et al. | |
| 2017/0070856 | A1 | 3/2017 | Kim | |
| 2018/0324548 | A1 | 11/2018 | Venkatraman et al. | |

* cited by examiner

*Primary Examiner* — Joseph E Dean, Jr.
(74) *Attorney, Agent, or Firm* — Reinhart Boerner Van Deuren s.c.

(57) ABSTRACT

Described herein are various methods of electronically managing connections between different people. In one example, a user send a request to a possible connection that identifies a distance range. The distance range represents a proposed distance at which the user and the connection will receive a notification when the user and connection are within that agreed-upon distance.

20 Claims, 5 Drawing Sheets

CUSTOMIZED PAIRED LOCATION TRACKING AND METHOD OF USE THEREOF

CROSS-REFERENCE TO RELATED PATENT APPLICATION

This application is a continuation of U.S. application Ser. No. 16/670,347, filed Oct. 31, 2019, which is incorporated herein by reference in its entirety.

BACKGROUND OF THE INVENTION

The present disclosure relates generally to relationship management and distribution. The present disclosure relates specifically to a method of providing customized location-based notifications to users.

Optimally people always know where their relevant contacts are and appropriately reach out to them when they are near each other. However, in some situations it can be useful to help notify people that they are near connections that they may want to contact.

SUMMARY OF THE INVENTION

According to one embodiment, a method of using this disclosure includes receiving a selection of a distance range from a plurality of distance ranges. The selection is received at a computing device being used by a user, such as for example the user's cell phone. The user then selects a potential contact. The user's computing device transmits, to a server, data identifying the potential contact person and the selected distance range. The user's computing device subsequently receives data that indicates the second person accepted the request to pair with the user at the suggested distance. In a specific embodiment a map is optionally displayed on the user's computing device. The map includes a location of the user, a plurality of geographical features in the vicinity of the user, an indication of the area within the map that is within a selected distance, and an indication that a connection is within their respective agreed-upon distance range.

According to another embodiment, a method of using this disclosure includes receiving, at a user's computing device (e.g., the user's cell phone), a selection of a distance range from a plurality of distances, and a selection of a proposed connection. Data is transmitted from the user's computing device, the data identifying the second person and the selected distance range. A response is received that indicates the proposed connection accepted the request to pair with the user at the selected distance range. As a result of the now-connection accepting the request to pair at the selected distance range, the user's computing device receives a notification that the connection is within the agreed-upon distance range.

According to another embodiment, a method of using this disclosure includes receiving, at a server, data from a first computing device (e.g., a cell phone) associated with a first person, the data identifying a second person and a proposed distance range. The server then transmits second data to a second computing device associated with the second person, the second data including a pairing request that identifies the first person and the distance range. The server then receives third data from the second computer device, the third data indicating that the second person accepts the pairing request. Then the server monitors the distance between the first and second persons, and when they get within the agreed-upon distance range the server sends a notification to each of the first person and the second person.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, described herein are various methods of electronically managing connections between people. A user can configure the system to provide a notification when certain people are within a specific distance range. However, the user may want different notification ranges associated with different people. For example, if the user lives in Milwaukee and the connection lives in Europe, the user and the connection may want a notification when they are within 100 miles of each other. On the other hand, if the user and the connection live 20 miles apart and work in the same city, to avoid being inundated with notifications the user and the connection may agree on a relatively short notification range, such as 0.25 miles. In one embodiment of this disclosure, applications running on users' cell phones communicate with one or more servers to provide the functionality described herein.

Figure 1:
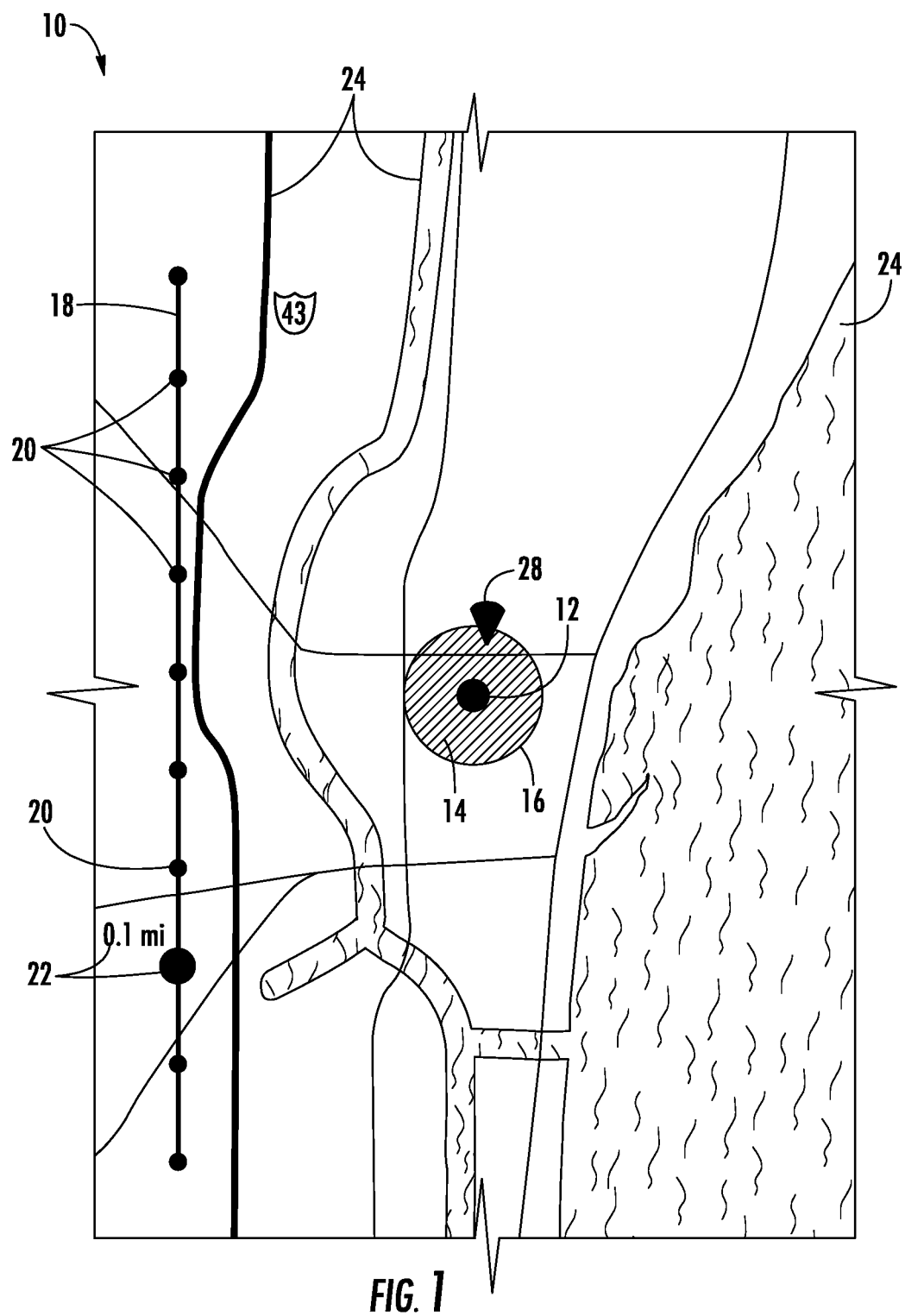
FIG. 1 is a schematic of an exemplary display, according to an exemplary embodiment.

Turning to FIG. 1, various aspects of a method of managing connections between different parties are depicted. Map 10 is a schematic representation of a display on a user-device, such as for example a cell phone. In various embodiments map 10 is generated by an application running on the cell phone based on data received from a server.

Map 10 shows the user location 12. In a specific embodiment the user location 12 is, by default, in the center of map 10. However, it is contemplated herein that the user 6 can move map 10 so that user location 12 is no longer at the center of the displayed map 10. As shown in map 10, the user 6 may select any of a plurality of distances 20 from the user location 12. The plurality of distances 20 are selectable via the scale bar 18, but it is contemplated herein that the user 6 may select a display distance 22 via any interface, such as for example a pull-down menu.

In the exemplary map 10 of FIG. 1, the selected display distance 22 of the plurality of distances 20 is 0.1 miles. Based on that selection, a periphery 16 around user location 12 is depicted in the map 10 where periphery 16 extends 0.1 miles from user location 12. Area 14 is within periphery 16, and includes the portions of the map 10 that are within the display distance 22 from the user location 12.

In various embodiments features 24 are depicted within map 10. For exemplary purposes only, features 24 may include one or more of highways, main roads, rivers, lakes, and parks. In various embodiments map 10 also includes business 28. For example, a central database or databases may store identifying information for one or more businesses 28 (e.g., an address, a website, a phone number). When a business 28 is within area 14 around user location 12, an icon is displayed on map 10, such as is shown in FIG. 1. The icon indicates the actual location of business 28 within map 10.

Figure 2:
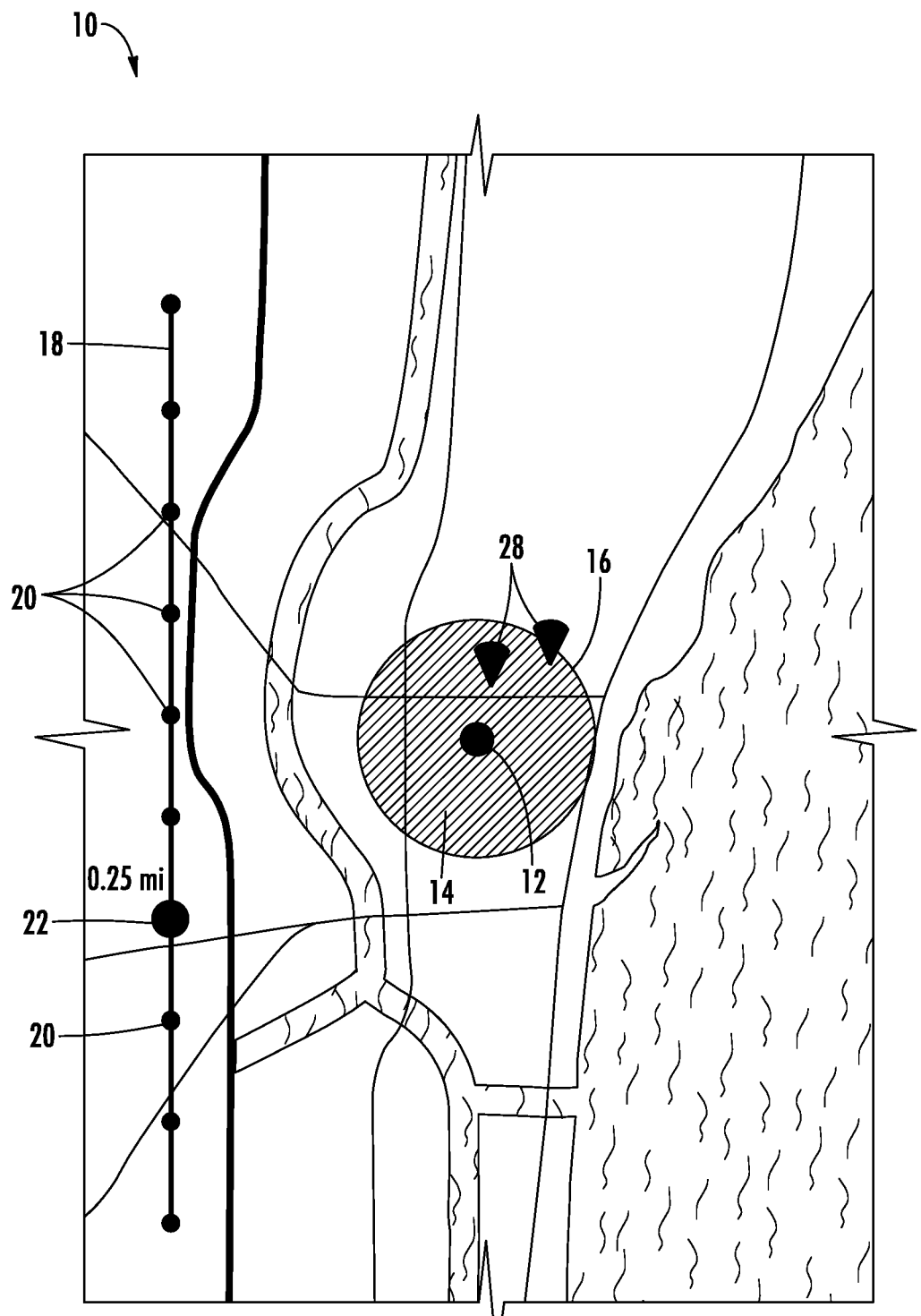
FIG. 2 is a schematic of an exemplary display, according to an exemplary embodiment.

Turning to FIG. 2, the user 6 can select one of the plurality of distances 20 on scale bar 18. For example, the map 10 may be displayed on a touch-screen interface, and the user 6 can touch the portion of the screen near the desired display distance 22 of the plurality of distances 20. In the embodiment shown in FIG. 2, the user 6 selected the display distance 22 that corresponds to 0.25 miles. After the display distance 22 is selected, the area 14 and the periphery 16 around area 14 are expanded to correspond to the display distance 22, with periphery 16 now defining a line that is 0.25 miles from user location 12. In this example, after area 14 is expanded to encompass a radius of 0.25 miles, a second business 28 is now within area 14 and consequently map 10 identifies a second business 28.

In one embodiment, a user 6 initially is not paired with any connections 26. For a user 6 to add a pairing with a connection 26, a user 6 selects a distance 20 from a plurality of distances 20. In a specific embodiment, the plurality of distances 20 include 100 feet, 250 feet, 0.1 miles, 0.25 miles, 1 mile, 5 miles, 25 miles, 100 miles, and a user-customizable distance (e.g., the user may select any distance). In another specific embodiment, the plurality of distances 20 include 0.1 miles, 0.25 miles, 0.5 miles, 1 mile, 2 miles, 5 miles, 10 miles, 20 miles, 50 miles and 100 miles.

The user 6 also selects a proposed connection 26. In a specific embodiment, the user 6 selects one or more people from a list of connections 26, such as a list generated from the contacts in an application that stores their contacts (e.g., Contacts), or a list generated from people with whom the user 6 has most recently exchanged texts and/or phone calls, or other inputs of contacts. Alternatively the user 6 may enter identifying information for a contact, such as by entering a phone number of a desired connection 26.

Data that includes the selected distance 20 and the one or more proposed connections 26 is transmitted from the user-device, in this example a cell phone, to a central server. The server transmits a pairing request to the electronic device, such as a cell phone, associated with the one or more selected possible connections 26. The pairing request includes the distance 20 selected by the user 6. In a specific embodiment, the server sends a respective pairing request for the selected possible connections 26 to the respective electronic devices of the respective connections 26.

The possible connections 26 are provided several responsive options. A first responsive option is for the connection 26 to accept the pairing request. If the connection 26 approves the request to pair with the user 6, the connection's 26 electronic device transmits an indication of acceptance to the central server, and optionally the central server transmits an indication to the user 6 that the respective connection 26 accepted the pairing request.

A second responsive option for a connection 26 is to propose an alternate distance 20 within which the people should pair. For example, if a connection 26 receives a pairing request from the user 6 for a distance 20 of 0.5 miles, the connection 26 may prefer a distance of 1 mile. Under this option, the connection's 26 electronic device transmits the new pairing request to the central server, which transmits the modified request to the user's electronic device. The data transmitted to the user's electronic device indicates that there is a new pairing request from the connection 26. The transmitted data identifies the connection 26 and the newly-identified distance 20 that connection 26 selected. At this point the user 6 is presented with one or more of the same options for the connection 26 that are currently being discussed.

A third responsive option for the connection 26 is for the connection 26 to decline the pairing request. In a specific embodiment the connection 26 is provided a mechanism to communicate the reason that the pairing request was declined, and the reason is communicated to either the user 6 and/or the server based on the connection's 26 selection. In another specific embodiment, no reason is provided but an indication is sent to the user 6, such as via sending a packet of data to the user's electronic device that the proposed connection 26 declined the request to pair.

Figure 3:
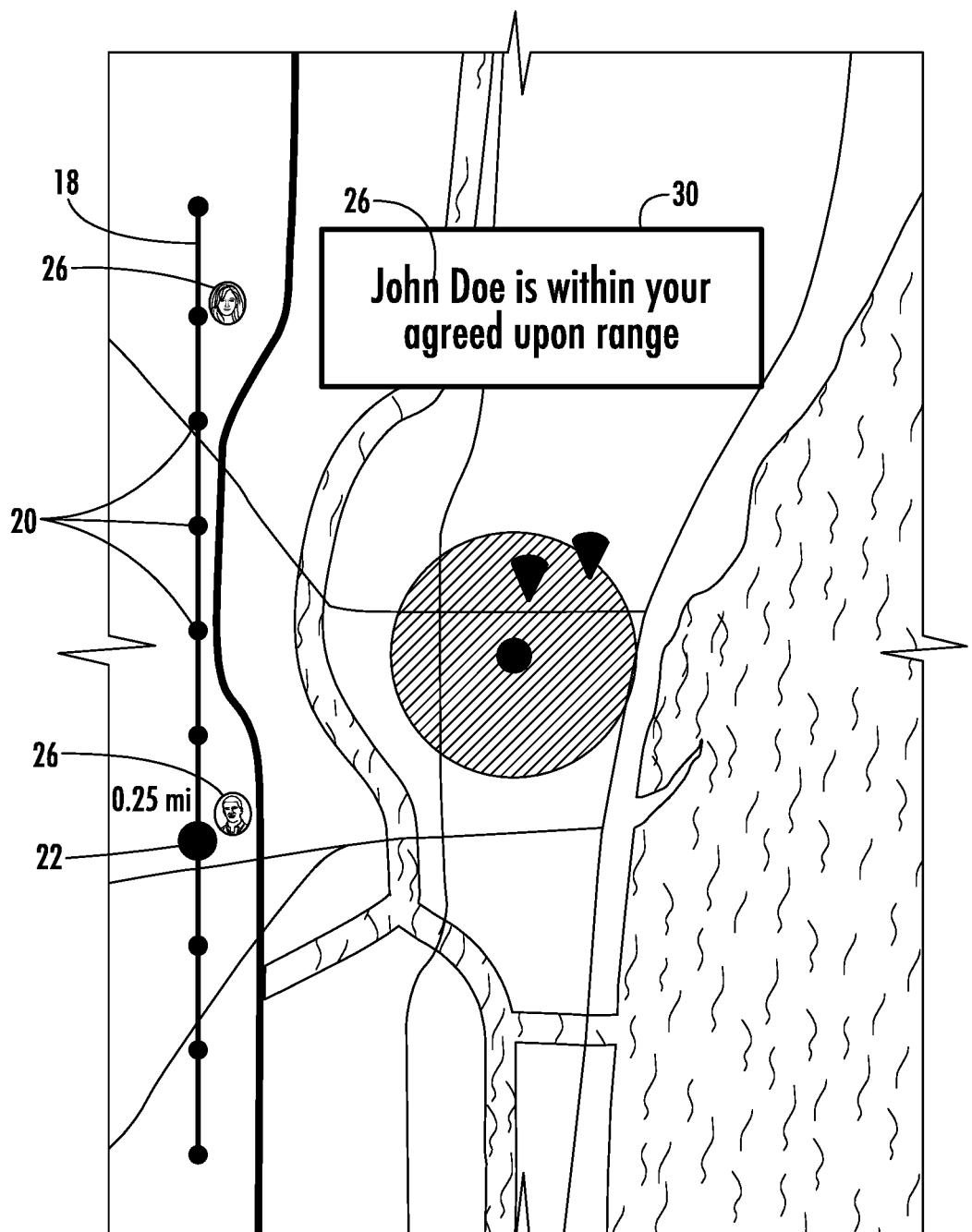
FIG. 3 is a schematic of an exemplary display, according to an exemplary embodiment.
Figure 4:
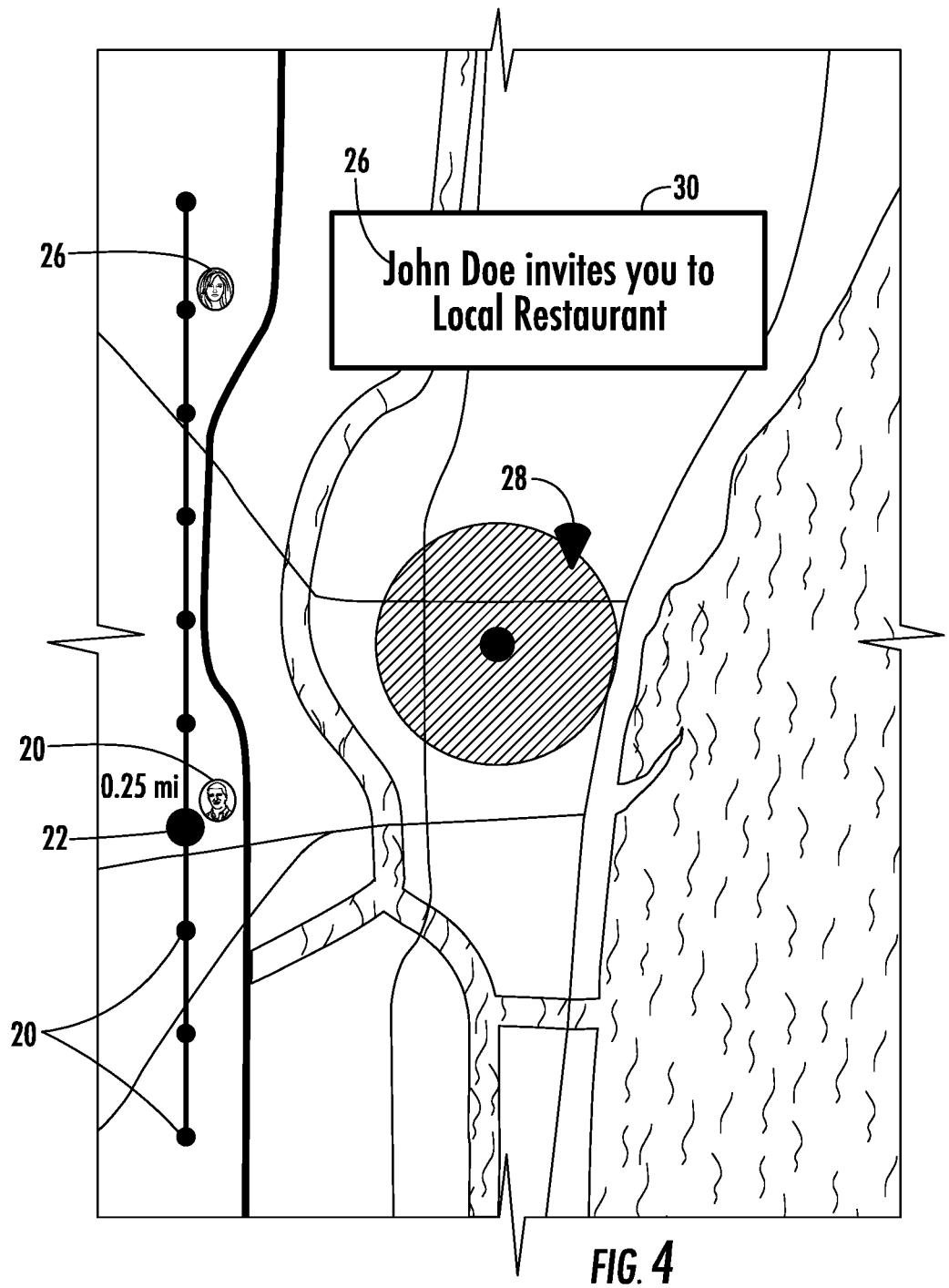
FIG. 4 is a schematic of an exemplary display, according to an exemplary embodiment.

Turning to FIGS. 3-4, depicted therein are various aspects of interacting with connections 26 that the user 6 is paired with. In these exemplary maps 10, the user 6 has two connections 26 that are within the distances 20 of the plurality of distances 20. These connections 26 are indicated on map 10 near the icons shown near scale bar 18.

In this example, the upper-most connection 26 has agreed with user 6 upon the second-highest distance 20 on the scale bar 18. Therefore, an icon representing that connection 26 is depicted near that second-highest distance 20 on scale bar 18. The lower-most connection 26 has agreed with user 6 upon the fourth-shortest distance 20 on the scale bar 18. Therefore, an icon representing that connection 26 is depicted near that fourth-lowest distance 20 on scale bar 18.

It is contemplated herein that the icon representing the connections 26 may be anywhere at, on and/or near the scale bar 18. In various alternate embodiments, map 10 does not include a numeric indication of the distance 20, which is to say map does not include the text "0.1 mi" or similar.

Turning to FIG. 3 in particular, depicted is an exemplary method of depicting a notification to the user 6 that a connection 26 is within the agreed-upon distance 20 for that connection 26. In this example, the connection 26 is within the agreed-upon distance 20 and as a result a notification 30 is provided to the user 6. In this example, notification 30 is a pop-up window within map 10. In another example, notification 30 includes an auditory (e.g., a sound) and/or tactile (e.g., a vibration of a cell phone) signal to the user 6 that a connection 26 is within the agreed-upon distance 20 for that connection 26. In another example, notification 30 includes one or more of a tactile signal, an auditory signal, and/or a visual signal (e.g., a pop-up window such as is shown in FIG. 3), and/or a notification within the user's electronic device (e.g., a notification bar on a cell phone's screen when it is initially accessed by a user).

In one configuration, the system periodically checks after a predetermined period of time (e.g., 5 minutes, 10 minutes, one hour) for whether the user 6 is within an agreed-upon distance 20 of connection 26. In another configuration, the system calculates the shortest distance that the user 6 must travel to be within an agreed-upon distance 20 of any one of user's connections 26 and based on that calculation determines a location refresh frequency to update the location of the user 6. For example, if the user 6 is traveling in Europe and all of the user's connections 26 are in the United States, then the system determines that the user's location 12 needs to be updated much less frequently (e.g., every 12 hours). This will save battery life of the user's cell phone as well as lowering the processing load for the server.

In a specific embodiment 9, the location refresh frequency to recalculate the user's location 12 is determined based on a total distance the user 6 has traveled over a previous threshold period of time. In one configuration, the total distance the user 6 has traveled based on determining the total distance the user's cell phone has traveled. In various configurations, the threshold time period to measure the user's total traveled distance is since the last refresh of the user's location 12, over the last 15 minutes, 30 minutes, one hour, 6 hours, 12 hours, and/or one day.

In one embodiment, the location of the user 6 and/or the connection 26 is calculated via a GPS system. In another embodiment, the location of the user 6 and/or the connection 26 is calculated via one or more of a GPS system, an accelerometer, a comparison of the shortest distance to a connection and measurements from the accelerometer. For example, if the user 6 is 100 miles from the agreed-upon distance 20 of the nearest connection 26, as long as the user 6 remains relatively stationary it is unlikely the user 6 will get the agreed-upon distance 20 of the nearest connection 26, so updates of the user's location and comparison of the user's location and the connection's 26 location can be relatively less frequent.

In a specific configuration, the only connections 26 displayed in map 10 are the connections 26 with an agreed-upon distance 20 that corresponds to the operative distance 22 currently being displayed on the map 10. For example, if the displayed distance 22 is 10 miles, and the user 6 has a first connection 26 with an agreed-upon distance 20 of 10 miles, a second connection 26 with an agreed-upon distance of 15 miles, and a third connection 26 with an agreed-upon distance of 1 mile, the only connection 26 displayed in map 10 is the first connection 26 that has an agreed-upon distance 20 that matches the display distance 22. In another configuration, every connection 26 that has an agreed-upon distance 20 less than or equal to the display distance 22 is displayed within map 10.

In one configuration, if the user 6 is expected to be within an agreed-upon distance 20 of connection 26 for less than a threshold period of time, then no notification will be sent. For example if the user 6 is driving on the interstate and will be within the agreed-upon distance 20 of a connection 26 for less than 15 seconds, the system may determine that no notification should be sent.

In one situation, a user 6 may wish to adjust the agreed-upon distance 20 with a connection 26. The user 6 may initiate adjusting distance 20 by sending an updated pairing request to the connection 26 that includes the new distance (e.g., by sending the request to an intervening server, which itself sends the request to the connection 26). When the connection 26 receives the request to update the pairing with the new distance, the connection 26 can either accept the new distance 20, reject the new distance 20 so the distance 20 remains unchanged, or send a revised pairing request that identifies yet another distance 20.

In another situation, a user 6 may elect to disassociate with the connection 26. To un-pair with the connection 26, the user 6 sends a deletion request to the server, which deactivates (e.g., deletes) the association between the user 6 and the connection 26, and optionally sends a notification to the connection 26 that their pairing with the user 6 has been terminated.

In a specific embodiment the user's electronic device receives no data that indicates anything about the location of the connection 26 within distance 20 beyond the mere fact that the connection 26 is within distance 20. In this way the actual location of connection 26 is provided a level of security and shielded from the user 6. Even if the user 6, or a third party, attempts to intercept the data communicated to user's electronic device, the data does not include any indication of the actual location of the connection 26, beyond the fact that connection 26 is within distance 20.

In an alternate embodiment, aspects of the connection's 26 location may be communicated to the user 6. For example, the fact that the connection 26 is within a sports arena may be communicated to the user 6. As another example, the fact that the connection is within the grounds of a festival or a park may be communicated to the user 6.

In one situation a user 6 may "check-in" to an event, such as a sporting event at an arena or a festival at a park. For any of user's connections 26 for which their agreed-upon distance 20 is smaller than the geographical bounds of the event (e.g., the dimensions of the park) is smaller than the event the user 6 is checked-in at, the agreed-upon distance with respect to the respective connection 26 is temporarily increased to the range of the event. This allows user 6 to more easily identify contacts that are also at the event. When the event terminates the user 6 may check-out of the event, or geo-fencing analysis of the user's location may determine that the user 6 has left the event and auto check-out the user from the event.

Turning to FIG. 4, the user 6 may receive an invitation from a connection 26 to attend a business 28 within area 14. In a specific example, the selected business 28 may be within the area 14 around the user's location 12. In another example, the selected business 28 may be within the area 14 around the connection's 26 location. In another example, the selected business 28 may be inside neither area 14.

As shown in FIG. 4, the invitation may be in the form of a pop-up window. In another example the invitation may invoke a tactile or an auditory signal to the user 6. In another example the invitation may include one or more of a tactile signal, an auditory signal, and/or a visual signal (e.g., a pop-up window such as is shown in FIG. 3), and/or a notification within the user's electronic device (e.g., a notification bar on a cell phone's screen when it is initially accessed by a user).

When the user 6 receives a request from connection 26 to meet at business 28, and the user 6 accepts the request, the user 6 may receive traveling instructions to business 28. For example, map 10 may show a path for user 6 to travel to business 28.

In one situation, the user 6 may turn on a Ghost Mode in which the system does not consider whether the user 6 is near any connections 26. For example, if the user 6 is at an important family event the user 6 may wish to temporarily stop any notifications being sent to connections 26 that the user 6 is within the agreed-upon range without the user having to turn their phone off or ensure that the application running aspects of this disclosure has been fully terminated.

In one embodiment the location 12 of users 6 is stored for a period of time on a central server. For exemplary purposes only and without limitation the location data could be stored until the next location 12 is received, for a period of one hour, one day, one month, one year, etc.

Figure 5:
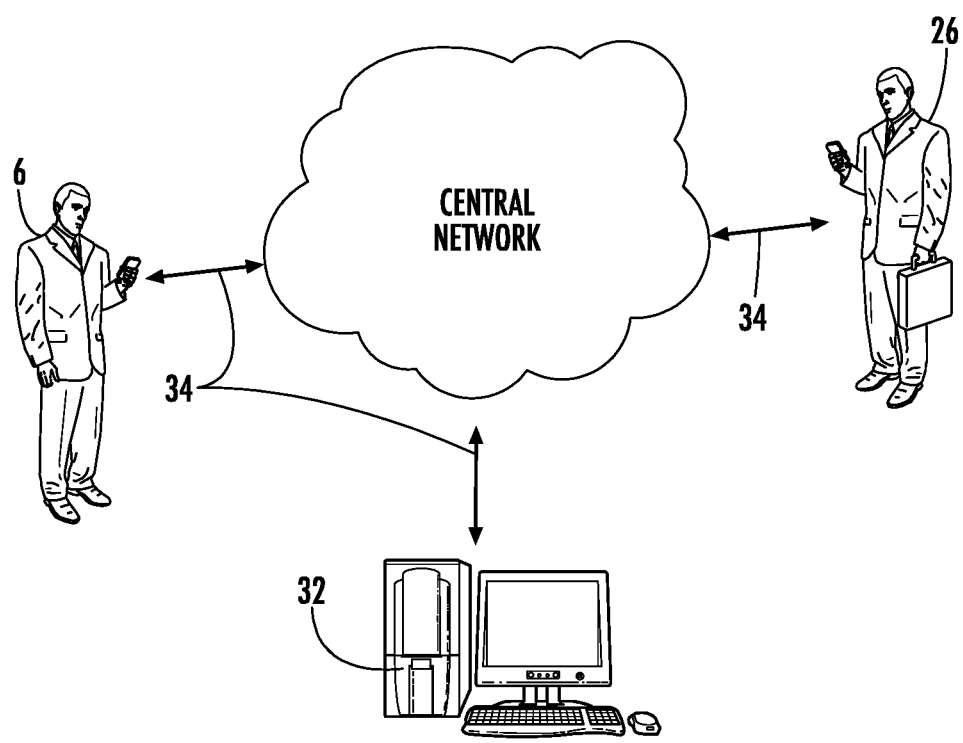
FIG. 5 is a schematic view of a networking environment that utilizes the processes described herein, according to an exemplary embodiment.

Referring to FIG. 5, in various embodiments, user's 6 computing device and connection's 26 computing device are in communication via central network. In one embodiment both computing devices are cellular phones. However, it is contemplated herein that any computing device may be used to practice this disclosure, including, for exemplary purposes only and without limitation, a cell phone, a smart watch, a tablet, a laptop, and/or a desktop.

In various embodiments user's 6 computing device and/or connection's 26 computing device include one or more of a processor, a memory, an output interface, and an input interface. The one or more of a processor is one or more of a general processor unit, an ASIC, a Field Programmable Gate Array (FPGA), firmware and/or a graphics processor. The memory is one or more of a hard drive, a RAM, and/or a processor cache. The output interface is one or more of a network interface card, and/or a display. The input interface is one or more of a keyboard, a mouse, a network interface card (which may also function as an output interface card), and/or touchscreen display. It is further considered herein that the central network may be one or more of an intranet, the Internet, and/or any electronic network of one or more computing devices.

In a specific embodiment the steps of this disclosure are practiced by a system, such as a computing device, that includes at least one processor and a memory storing instructions that, when executed by the at least one processor, cause the system to perform one or more of the steps and/or processes described herein.

In another specific embodiment a system, such as a computing device, includes at least one processor and a memory, such as a non-transitory computer readable storage medium including instructions that, when executed by the at least one processor, cause the system to perform one or more of the steps and/or processes described herein.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A method comprising:
    receiving, at a first computer device associated with a first person, a selection of a distance range from a plurality of distance ranges;
    receiving, at the first computer device, a selection of a second person;
    transmitting first data from the first computing device, the first data identifying the second person and the selected distance range, the first data corresponding to a request to pair the first person with the second person at the selected distance range;
    receiving second data at the first computer device, the second data indicating the second person accepted the request to pair the first person with the second person at the selected distance range;
    displaying a map on the first computing device, the map comprising:
        a location of the first person;
        a plurality of geographical features in the vicinity of the first person, the plurality of geographical features selected from the group consisting of a road, a body of water, a town, a city, and a state border;
        an indication of the area within the map that is within a second distance range, of the plurality of distance ranges, from the first person; and
        an indication that the second person is within the selected distance range.

2. The method of claim 1, wherein the map further comprises a scale bar comprising a plurality of selectable options that correspond to the plurality of distance ranges.

3. The method of claim 1, wherein each option of the plurality of selectable options comprises a distinct distance range.

4. The method of claim 3, further comprising:
    receiving a selection of a third distance range; and
    modifying the displayed map such that the modified map includes an indication of the area within the map that is within the third distance range rather than an indication of the area within the map that is within the second distance range.

5. The method of claim 1, wherein the indication that the second person is within the selected distance range is generated as a result of the first computing device receiving a notification that the second person is within the selected distance range.

6. The method of claim 1, wherein the map further includes an indication of the exact location of a business.

7. The method of claim 1 further comprising:
    receiving, at the first computer device, a selection of a second distance range from the plurality of distance ranges;
    receiving, at the first computer device, a selection of a plurality of people; and transmitting, from the first computing device, third data identifying the second distance range and the third data further identifying the plurality of people.

8. The method of claim 1 further comprising:
receiving, at the first computer device, a selection of a second distance range from the plurality of distance ranges;
receiving, at the first computer device, a selection of the second person; and
transmitting, from the first computing device, a request to modify the pairing with the second person, the request including data identifying the second distance range and the second person.

9. The method of claim 3, wherein the notification does not include any information about the location of the second person beyond the fact that the second person is within the selected distance.

10. The method of claim 1, wherein the map further comprises a plurality of selectable options that correspond to the plurality of distance ranges.

11. The method of claim 1, wherein the second distance range, which is displayed on the map, is the same as the selected distance range.

12. A method comprising:
receiving, at a first computer device associated with a first person, a selection of a distance range from a plurality of distances;
receiving, at the first computer device, a selection of a second person;
transmitting first data from the first computing device, the first data identifying the second person and the selected distance range, the first data corresponding to a request to pair the first person with the second person at the selected distance range;
receiving second data at the first computer device, the second data indicating the second person accepted the request to pair the first person with the second person at the selected distance range;
as a result of the second person accepting the request to pair at the selected distance range, receiving a notification that the second person is within the selected distance range.

13. The method of claim 12, wherein the notification does not include any information about the location of the second person beyond the fact that the second person is within the selected distance range.

14. The method of claim 12 further comprising:
receiving, at the first computer device, a selection of a second distance range from the plurality of distances;
receiving, at the first computer device, a selection of a plurality of people; and
transmitting, from the first computing device, third data identifying the second distance range and the third data further identifying the plurality of people.

15. The method of claim 12 further comprising:
receiving, at the first computer device, a selection of a second distance range from the plurality of distances;
receiving, at the first computer device, a selection of the second person; and
transmitting, from the first computing device, a request to modify the pairing with the second person, the request including data identifying the second distance range and the second person.

16. A method comprising:
receiving first data from a first computing device associated with a first person, the first data identifying a second person and a selected distance range;
transmitting second data to a second computing device associated with the second person, the second data comprising a pairing request that identifies the first person and the selected distance range;
receiving third data from the second computer device, the third data indicating the second person accepts the pairing request;
as a result of the second person accepting the pairing request:
receiving a location of the first person;
receiving a location of the second person;
calculating an actual distance between the first person and the second person;
comparing the actual distance to the selected distance range;
as a result of comparing the actual distance to the selected distance range:
transmitting a first notification to the first computing device that the second person is within the selected distance range; and
transmitting a second notification to the second computing device that the first person is within the selected distance range.

17. The method of claim 16, wherein the first notification to the first computing device does not include any information about the location of the second person beyond the fact that the second person is within the selected distance range, and wherein the second notification to the second computing device does not include any information about the location of the first person beyond the fact that the first person is within the selected distance range.

18. The method of claim 16 further comprising:
receiving fourth data from the first computer device, the fourth data identifying a second distance range and the fourth data further identifying a plurality of people; and
for each of the plurality of people, transmitting, to a computing device associated with the respective person of the plurality of people, data comprising a pairing request that identifies the first person and the second distance range.

19. The method of claim 16 further comprising:
as a result of receiving the third data indicating the second person accepts the pairing request, storing in a database an association between the first person, the second person, and the selected distance range.

20. The method of claim 19 further comprising:
receiving fourth data; and
as a result of receiving fourth data, storing an indication the association between the first person and the second person has been deactivated.

* * * * *